US011175030B2

(12) United States Patent
Yasutake

(10) Patent No.: US 11,175,030 B2
(45) Date of Patent: Nov. 16, 2021

(54) LED LIGHTING DEVICE

(71) Applicant: ROHM Co., Ltd., Kyoto (JP)

(72) Inventor: Ippei Yasutake, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 0 days.

(21) Appl. No.: 16/797,978

(22) Filed: Feb. 21, 2020

(65) Prior Publication Data

US 2020/0271308 A1 Aug. 27, 2020

(30) Foreign Application Priority Data

Feb. 27, 2019 (JP) .............................. JP2019-033605

(51) Int. Cl.
*F21V 29/76* (2015.01)
*F21S 41/141* (2018.01)
*F21V 23/00* (2015.01)
*F21Y 115/10* (2016.01)

(52) U.S. Cl.
CPC .......... *F21V 29/763* (2015.01); *F21S 41/141* (2018.01); *F21V 23/004* (2013.01); *F21Y 2115/10* (2016.08)

(58) Field of Classification Search
CPC .... F21V 23/004; F21V 23/003; F21V 29/763; F21V 23/005; F21S 41/141; F21S 41/143
See application file for complete search history.

(56) References Cited

U.S. PATENT DOCUMENTS

| 2011/0037387 | A1* | 2/2011 | Chou | ..................... | F21V 29/83 |
| | | | | | 315/35 |
| 2014/0246990 | A1* | 9/2014 | Kim | ....................... | H05B 45/24 |
| | | | | | 315/250 |
| 2019/0323666 | A1* | 10/2019 | Rieder | ..................... | F21K 9/23 |
| 2019/0364627 | A1* | 11/2019 | Takeguchi | ............. | H05B 45/14 |

FOREIGN PATENT DOCUMENTS

| CN | 207678045 U | 7/2018 |
| JP | 2012119243 A | 6/2012 |

OTHER PUBLICATIONS

Chinese Office Action issued in Chinese Application No. 202010112805. 0, dated Aug. 23, 2021, brief English Translation provided.

* cited by examiner

*Primary Examiner* — Karabi Guharay
(74) *Attorney, Agent, or Firm* — Hamre, Schumann, Mueller & Larson, P.C.

(57) ABSTRACT

The object of the present disclosure is to provide a light-emitting diode (LED) lighting device capable of suppressing temperature rise in an LED chip and a driver integrated circuit. An LED lighting device includes: a substrate including a base material having a main surface, and wiring patterns configured on the main surface; an LED chip, disposed on the main surface; multiple connection terminals, arranged in an x-direction, respectively connected to the wiring patterns; and a driver integrated circuit, disposed on the main surface, driving the LED chip. The driver integrated circuit is configured in a y-direction on one side opposite to the connection terminals with respect to the LED chip.

19 Claims, 11 Drawing Sheets

LED LIGHTING DEVICE

BACKGROUND OF THE INVENTION

Field of the Invention

The present invention relates to an LED (light-emitting diode) lighting device including an LED chip as a light source.

Description of the Prior Art

An LED lighting device can be utilized as an automotive lighting device, such as a tail lamp of an automobile or a motorcycle. Patent document 1 discloses an example of a conventional LED lighting device. The LED lighting device disclosed by patent document 1 includes an LED chip disposed in the center of a substrate, and electronic components of a driver circuit for driving the LED chip are configured around the LED chip.

Further miniaturized LED lighting devices are expected in the industry. In order to realize component miniaturization, a driver integrated circuit for electronic components of a driver circuit has been in the process of developing. If a substrate for disposing an LED chip and a driver integrated circuit are miniaturized in order to achieve an improved miniaturization of an LED lighting device, the LED chip and the driver integrated circuit would be arranged closer to each other. Hence, the LED chip and the driver integrated circuit are heated by heat generated from each other, which may result in elevating temperature.

PRIOR ART DOCUMENTS

Patent Publication

[Patent document 1] Japan Patent Publication No. 2012-119243

SUMMARY OF THE INVENTION

Problems to be Solved by the Invention

The present invention is conceived based on the situation above, and aims to provide an LED lighting device capable of suppressing temperature rise in an LED chip and a driver integrated circuit.

Technical Means for Solving the Problem

An LED lighting device provided by the present invention is characterized in including: a substrate, including a base material having a main surface, and wiring patterns configured on the main surface; an LED module disposed on the main surface; a plurality of connection terminals arranged in a first direction orthogonal to a thickness direction of the substrate, respectively connected to the wiring patterns; and a driver integrated circuit disposed on the main surface, driving the LED module, configured in a second direction orthogonal to the thickness direction and the first direction on one side opposite to the connection terminals with respect to the LED module.

Further, the LED module of the present invention includes an LED single chip, and an LED package formed by sealing the LED chip with resin.

Effects of the Invention

In an LED lighting device according to the present invention, a driver integrated circuit is configured in a second direction on one side opposite to the connection terminals with respect to the LED module. The LED lighting device is used in orientation that the connection terminals are configured vertically below. That is to say, in the state of being used, the driver integrated circuit is configured at a position vertically above the LED module. Thus, temperature rise in the driver integrated circuit and the LED module can be suppressed.

Other features and advantages of the present invention will become more apparent in the detailed description given with the accompanying drawings below.

DETAILED DESCRIPTION OF THE EMBODIMENTS

Figure 1:
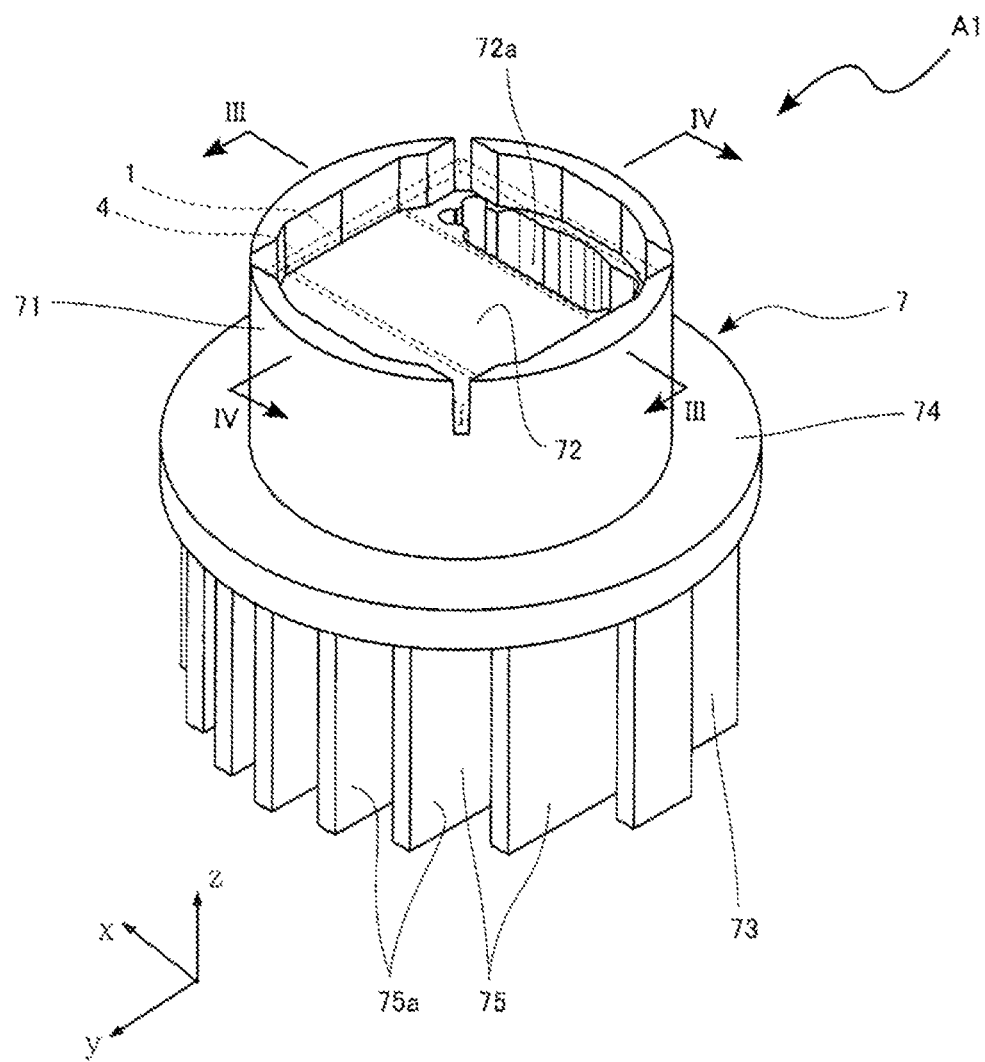
FIG. 1 is a three-dimensional diagram of an LED lighting device according to a first embodiment of the present disclosure.

Specific details of preferred embodiments of the present disclosure are described with the accompanying drawings below.

First Embodiment

FIG. 1 to FIG. 6 show an example of an LED lighting device of the present disclosure. The LED lighting device A1 of this embodiment of the present disclosure is an automotive lighting device, for example, used as a tail lamp or a stop lamp. The LED lighting device A1 includes a substrate 1, a plurality of LED chips 2, a frame 3, sealing resin 35, an adhesive member 4, a plurality of electronic components 5, a pin header 65 and a socket 7.

Figure 2:
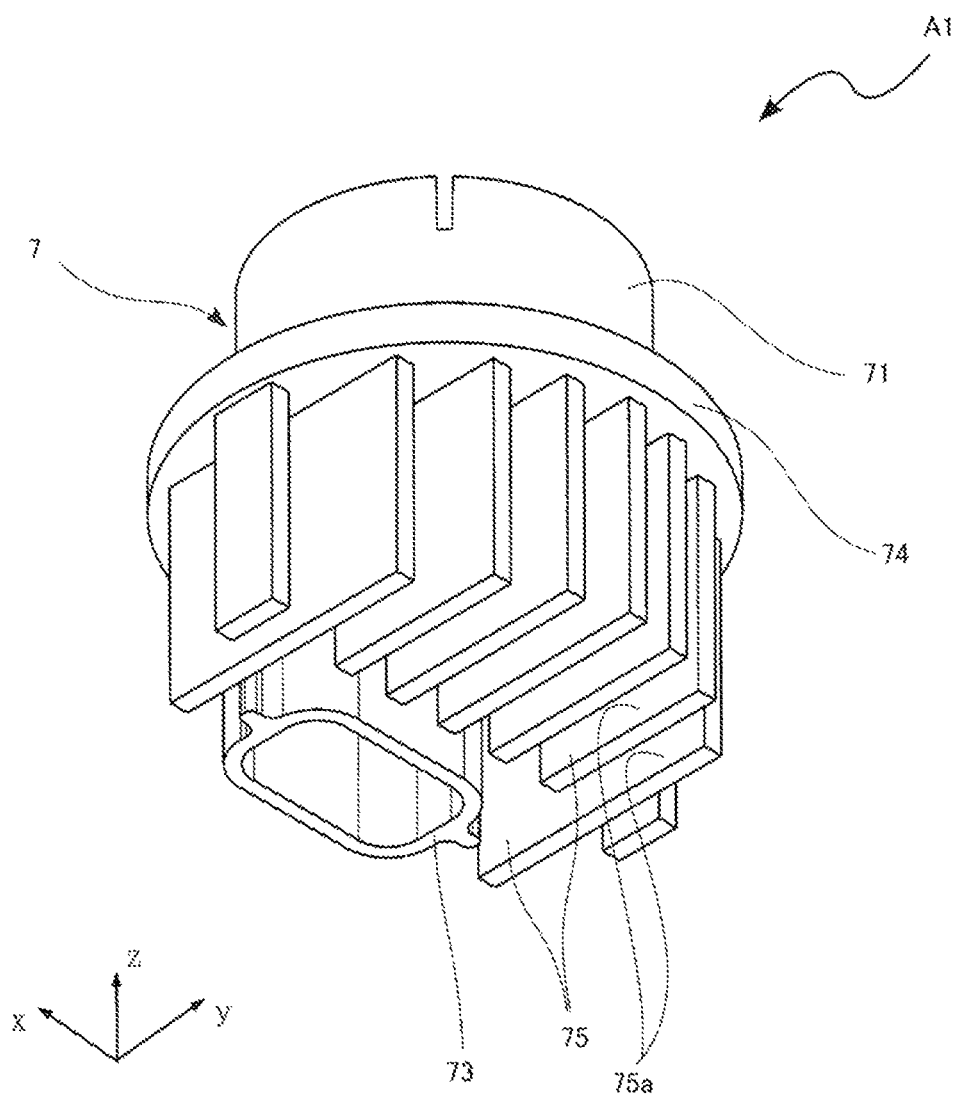
FIG. 2 is a three-dimensional diagram of the LED lighting device in FIG. 1 and is a diagram observed from one side opposite to that in FIG. 1.
Figure 3:
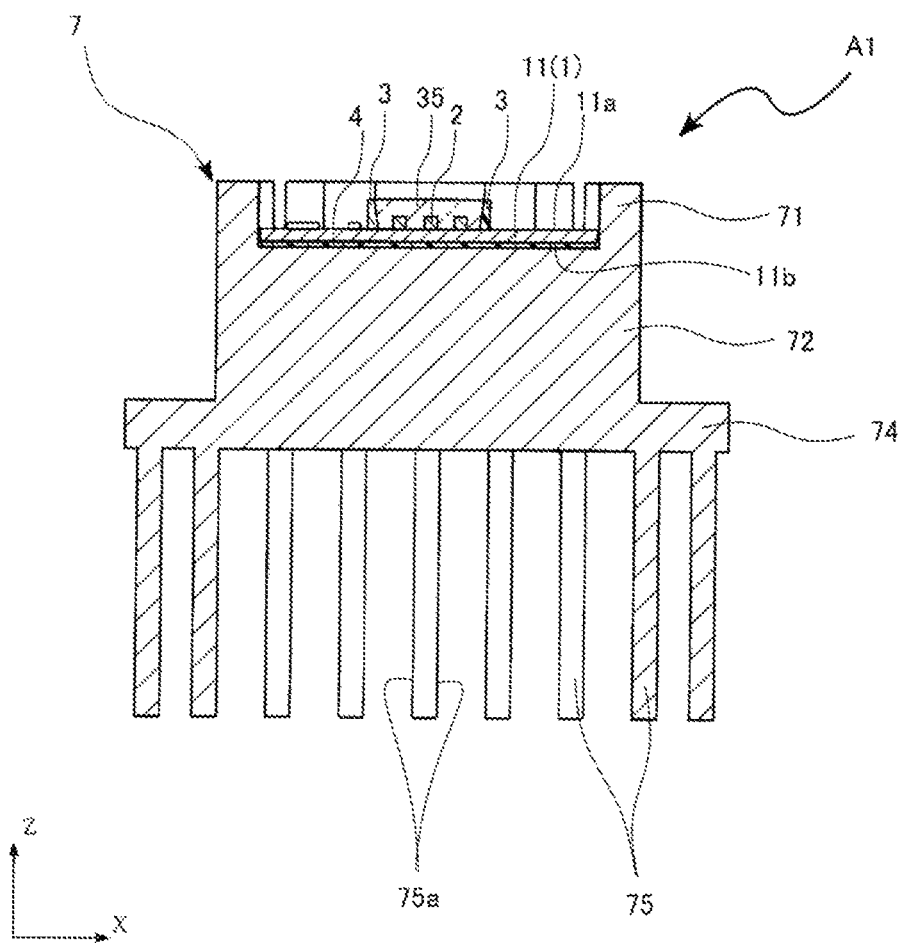
FIG. 3 is a sectional diagram taken along line III-III in FIG. 1.
Figure 4:
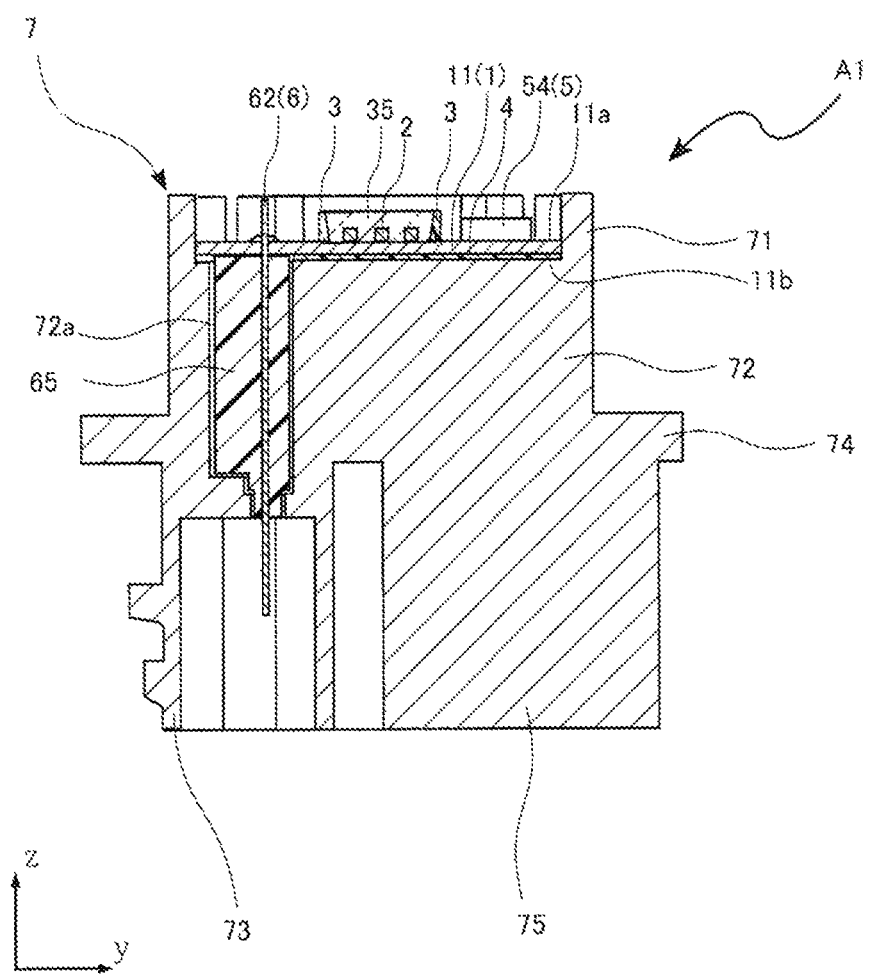
FIG. 4 is a sectional diagram taken along line IV-IV in FIG. 1.
Figure 5:
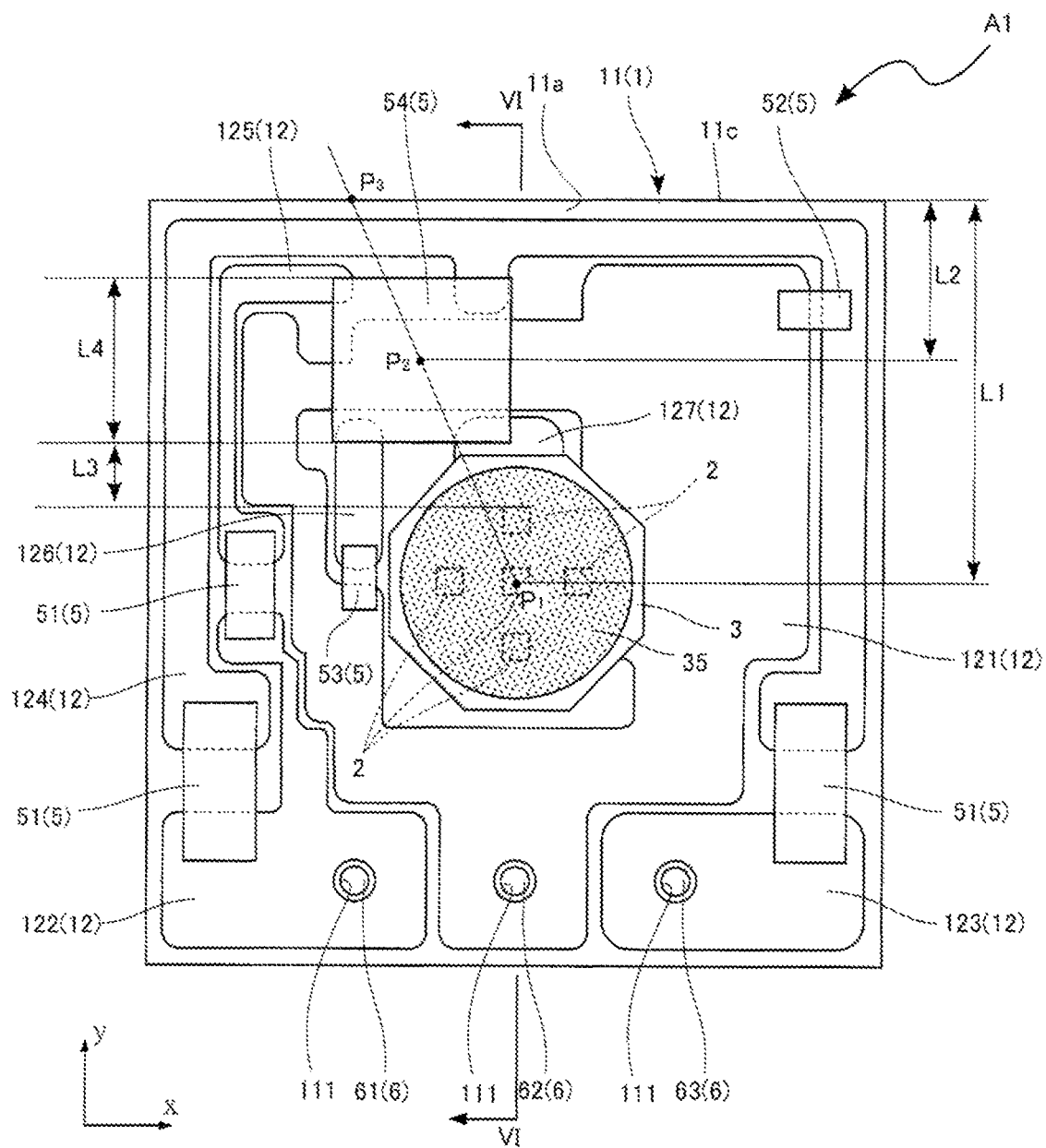
FIG. 5 is a top view of a main part of the LED lighting device in FIG. 1.
Figure 6:
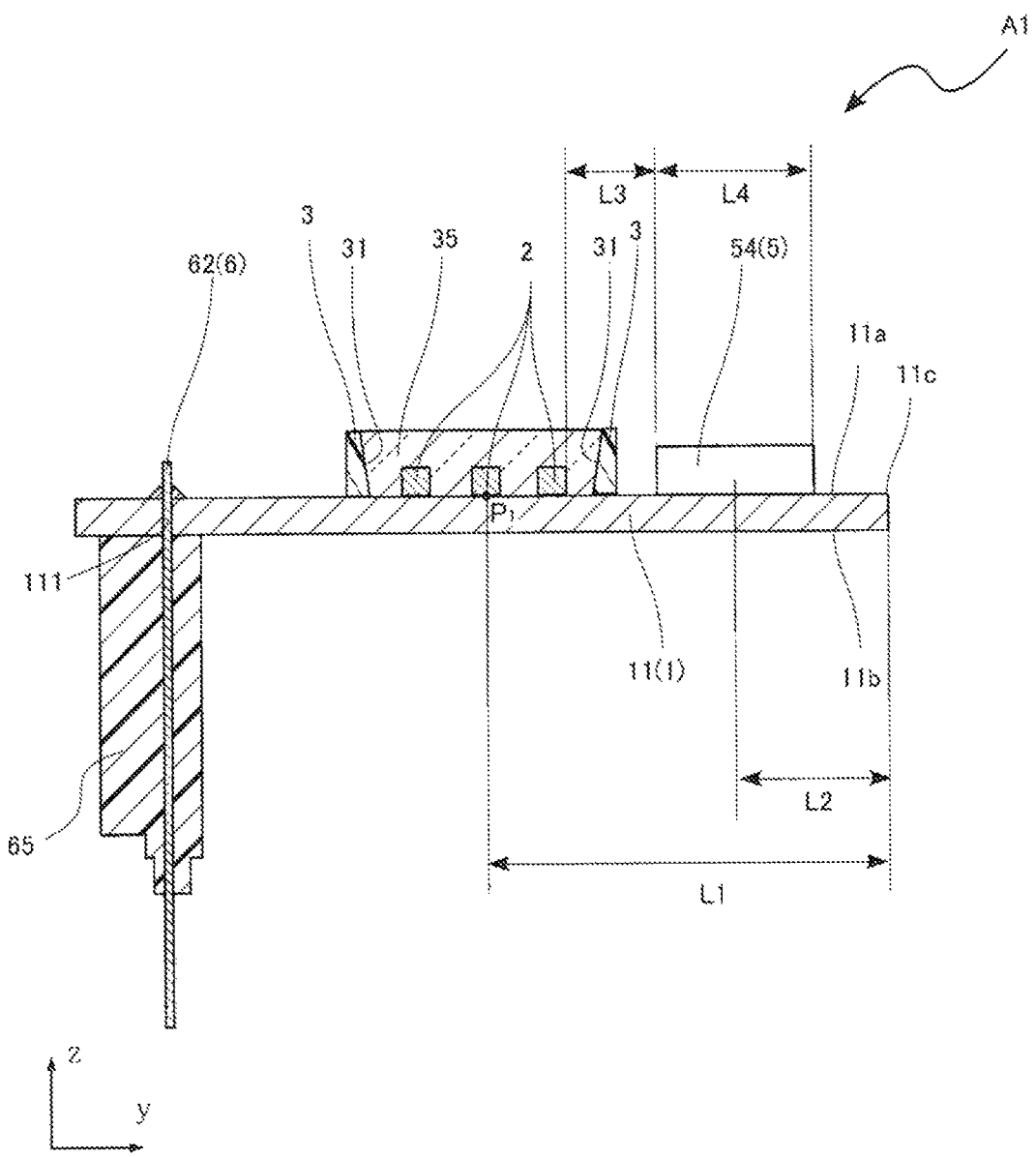
FIG. 6 is a sectional diagram taken along line VI-VI in FIG. 5.

FIG. 1 shows a three-dimensional diagram of the LED lighting device A1. Further, for better understanding, FIG. 1 depicts the substrate 1 and the adhesive member 4 in a perspective manner. FIG. 2 shows a three-dimensional diagram of the LED lighting device A1 and is a diagram observed from one side opposite to that in FIG. 1. FIG. 3 shows a sectional diagram taken along line III-III in FIG. 1. FIG. 4 shows a sectional diagram taken along line IV-IV in FIG. 1. FIG. 5 shows a top view of a main part of the LED lighting device A1. FIG. 6 shows a sectional diagram taken along line VI-VI in FIG. 5.

The substrate 1 is for disposing the LED chip 2 and the electronic components 5, and is supported by the socket 7. As shown in FIG. 5, the substrate 1 appears as a rectangle when observed from the thickness direction. In the drawings, the thickness direction (a top view direction) of the substrate 1 is set as a z-direction, the direction of one side of the substrate 1 orthogonal to the z-direction (the left-right direction in FIG. 5) is set as an x-direction, and a direction orthogonal to the z-direction and the x-direction (the up-down direction in FIG. 5) is set as a y-direction for illustration. The z-direction is equivalent to the "thickness direction" of the present disclosure, the x-direction is equivalent to a "first direction" of the present disclosure, and the y-direction is equivalent to a "second direction" of the present disclosure. The dimensions of the substrate 1 in the x-direction and in the y-direction are approximately 10 to 20 mm, and are approximately 14 mm in this embodiment. However, each of the dimensions of the substrate 1 is not specifically limited thereto. Further, the shape of the substrate 1 observed in the z-direction is not limited to being a rectangle, and can be an octagon or a circle. Further, the substrate 1 includes a base material 11 and wiring patterns 12.

The base material 11 can be made of, for example, ceramic. In this embodiment, the base material 11 appears as a rectangle when observed in the z-direction. However, the material of the base material 11 is not limited. The base material 11 has a main surface 11a and a back surface 11b. The main surface 11a and the back surface 11b are surfaces mutually facing opposite directions in the z-direction. The main surface 11a is a surface facing the upper side in FIG. 3, FIG. 4 and FIG. 6, the wiring patterns 12 is formed thereon and the main surface 11a is for disposing the LED chip 2 and the electronic components 5. The back surface 11b is a surface facing the lower side in FIG. 3, FIG. 4 and FIG. 6. The base material 11 includes multiple through holes 111. As shown in FIG. 6, the through holes 111 are parallel to the z-direction, pass through from the main surface 11a to the back surface 11b, and as shown in FIG. 5, are arranged along the x-direction on one end closer to the y-direction. In this embodiment, there are three through holes 111.

The wiring patterns 12 are formed on the main surface 11a of the base material 11. The wiring patterns 12 include, for example, patterned plating layers of Cu, Ni, Au and so on. The wiring patterns 12 constitute pads for installing the LED chip 2 or conductive paths to the LED chip 2. Further, the wiring patterns 12 constitute pads for installing the electronic components 5 or conductive paths for electrically connecting the electronic components 5 and the LED chip 2. In this embodiment, as shown in FIG. 5, the wiring patterns 12 include wiring patterns 121 to 127. The wiring patterns 121 to 127 are configured separately from one another. Top, down, left and right in the following description of the wiring patterns 121 to 127 represent the directions illustrated in FIG. 5.

The wiring pattern 121 has a ring-shaped configuration that surrounds the frame 3, and extends from the center in the x-direction to near an edge of the lower side of the main surface 11a, and occupies a larger part of the main surface 11a. The wiring pattern 121 surrounds the through hole 111 in the center. The wiring pattern 121 is a wiring pattern 12 for grounding. The wiring pattern 122 is configured on the lower left corner, and surrounds the through hole 111 on the left side. The wiring pattern 123 is configured on the lower right corner, and surrounds the through hole 111 on the right side. The wiring patterns 122 and 123 are wiring patterns 12 for input. The wiring pattern 124 is configured to surround the wiring pattern 121, and is U-shaped having an opening on the lower side. That is, the shape of the wiring pattern 124 is a combination of the following parts: a part extending along the upper edge of the main surface 11a to near two ends in the x-direction, a part extending along the left edge of the main surface 11a to near the wiring pattern 122, and a part extending from the right edge of the main surface 11a to near the wiring pattern 123.

The wiring pattern 125 is on the left of the wiring pattern 121, and is between the wiring pattern 121 and the wiring pattern 124. The wiring pattern 126 and the wiring pattern 127 are configured in an area surrounded by the wiring pattern 121. The wiring pattern 126 is on the left of the frame 3, and is between the wiring pattern 121 and the frame 3. The wiring pattern 127 is a wiring pattern 12 that connects multiple LED chips 2. However, the shapes and configurations of the wiring patterns 12 described are merely an example, and the present disclosure is not limited thereto. Other wiring patterns 12 can be formed on the main surface 11a, or the wiring patterns 12 can be formed on the back surface 11b.

The plurality of LED chips 2 are light sources of the LED lighting device A1. The plurality of LED chips 2 are disposed near the center of the main surface 11a of the base material 11. As shown in FIG. 5, in this embodiment, five LED chips 2 are disposed on the substrate 1 in a manner of being surrounded by the frame 3. Each of the LED chips 2 has, for example, a lamination structure laminated with a plurality of semiconductor layers including such as GaN-based semiconductor material. In the case of the LED chips 2 include GaN-based semiconductor material, the LED chips 2 emit, for example, blue light. However, the color of the light emitted by the LED chips 2 is not limited. In each of the LED chips 2, electrode pads are disposed on surfaces mutually opposite to each other in the z-direction. One of the electrode pads of the LED chip 2 is bonded to the wiring pattern 12, and the other is connected to the wiring pattern 12 through a conductive wire. However, the structure of the LED chips 2 is not limited, and the means for disposing the LED chips 2 is also not limited.

In this embodiment, except for the LED chip 2 in the center, four LED chips 2 among the multiple LED chips 2 are connected to one another in series. On the other hand, the LED chip 2 in the center is connected in parallel to the four LED chips 2 connected in series. However, means for connecting the LED chips 2 is not limited, and the quantity of the LED chips 2 is also not limited, such as the LED lighting device A1 can also be disposed with only one LED chip 2. In this embodiment, each of the LED chips 2 is equivalent to an "LED module" of the present disclosure.

When observed in the z-direction, the frame 3 is formed in the center of the substrate 1, and surrounds the multiple LED chips 2. The frame 3 includes, for example, white resin. The frame 3 has a reflective surface 31. The reflective surface 31 is inclined relative to the z-direction, and surrounds the multiple LED chips 2 when observed in the z-direction. The reflecting surface 31 appears as a circle when observed in the z-direction. Further, the frame 3 appears as a polygon when observed in the z-direction, and is an octagon in this embodiment. However, shape of the frame 3 is not limited. An area of the main surface 11a surrounded by the frame 3 is equivalent to an "LED configuration area" of the present disclosure.

The sealing resin 35 is filled in the area surrounded by the frame 3, and covers the multiple LED chips 2. The sealing resin 35 is formed by, for example, a material of transparent silicone resin mixed with a fluorescent material. The fluorescent material is, for example, excited by blue light to emit yellow light. In this case, white light is emitted from the LED lighting device A1. However, the sealing resin 35 is not limited to the example above, and can also be transparent silicone resin. Further, the color of the light emitted from the LED lighting device A1 is not limited. In this embodiment, as shown in FIG. 6, the sealing resin 35 is formed in a manner of not protruding from the opening portion of the frame 3. However, the shape of the sealing resin 35 is not limited. For example, the sealing resin 35 can form a dome shape protruding from the opening portion of the frame 3, and serve as a lens having a light focusing function. Furthermore, the frame 3 can also be omitted (not formed), and the sealing resin 35 in the shape of a protruding dome can be directly formed on the substrate 1.

The pin header 65 is a male connector, and is configured on the back surface 11b of the base material 11, as shown in FIG. 6. In the pin header 65, for example, three through holes arranged in the x-direction and extending in the z-direction are formed on a body formed by resin such as PET (polyethylene terephthalate), and connection terminals 6 are inserted through the through holes. Each of the connection terminals 6 is electrode made of metal wires. Two ends of each of the connection terminals 6 protrude from the body of the pin header 65. The pin header 65 causes one end portion of the connection terminals 6 to be laterally inserted in the three through holes 111 from the back surface 11b of the base material 11 and to be fixed on the back surface 11b of the base material 11. Thus, in this embodiment, three connection terminals 6 are, in a state parallel to the z-direction, arranged in the x-direction at one end of the substrate 1 closer to one side of the y-direction. Three connection terminals 6 are, for example, electrically connected and bonded to the wiring patterns 12 of the substrate 1 by solder. Further, as shown in FIG. 4, the pin header 65 is inserted in a through opening 72a (to be described below) of the socket 7. The other end portion of the connection terminals 6 is located in an internal space of a connecting side cylindrical portion 73 (to be described below). Alternatively, in substitution to the pin header 65, three connection terminals 6 can also be directly inserted and configured in the through holes 111.

To differentiate the three connection terminals 6, as shown in FIG. 5, the connection terminal 6 electrically connected with the wiring pattern 122 is deemed as a connection terminal 61, the connection terminal 6 electrically connected with the wiring pattern 121 is deemed as a connection terminal 62, and the connection terminal 6 electrically connected with the wiring pattern 123 is deemed as a connection terminal 63. That is, the connection terminal 62 is used as a ground connection terminal, and the connection terminal 61 and the connection terminal 63 are input connection terminals. Further, in this embodiment, the ground connection terminal 62 is configured between the input connection terminals 61 and 63; however, the arrangement sequence of the connection terminals 61 to 63 is not limited to such example. For example, the ground connection terminal 62 can also be configured on the right, the input connection terminal 61 can be configured in the middle, and the input connection terminal 63 can be configured on the left, while the wiring patterns 12 are in matching configurations and shapes.

The multiple electronic components 5 drive and protect the multiple LED chips 2. The electronic components 5 are disposed on the main surface 11a of the base material 11, and are respectively connected by the wiring patterns 12. The electronic components 5 include diodes 51, a Zener diode 52, a thermistor 53 and a driver integrated circuit 54. Alternatively, the diodes 51 and the Zener diode 52 can also be disposed on the back surface 11b, or be disposed on other substrates. Further, the electronic components 5 can include other electronic components.

The diodes 51 are for preventing a reverse current (in reversed direction) in the circuit, and are, for example, protection diodes for preventing a circuit from damage of a reverse current in the event that the connection is mistakenly reversed. In this embodiment, as shown in FIG. 5, the diodes 51 are respectively connected between the wiring pattern 122 and the wiring pattern 124, between the wiring pattern 122 and the wiring pattern 125, and between the wiring pattern 123 and the wiring pattern 124. However, the diodes 51 can be omitted, given that a protective measure against reverse current can alternatively be implemented outside the LED lighting device A1.

The Zener diode 52 is for preventing overvoltage or surge voltage from being applied to the circuit, and is turned on if applied by a voltage above a certain value. In this embodiment, the Zener diode 52 is configured on the upper right in FIG. 5, and is connected to the wiring pattern 121 and the wiring pattern 124. However, the configuration position of the Zener diode 52 is not limited, given that it is connected to the wiring pattern 121 and the wiring pattern 124. Further, a TVS (transient voltage suppressor) diode or other overvoltage protection components can also be used in substitution to the Zener diode 52. Further, the Zener diode 52 can be omitted, given that a protective measure against overvoltage is alternatively implemented outside the LED lighting device A1.

The thermistor 53 is disposed near the LED chips 2, and is a sensor that detects the temperature of the LED chips 2. In this embodiment, as shown in FIG. 5, the thermistor 53 is configured substantially next to the left of the frame 3, and is connected to the wiring pattern 121 and the wiring pattern 126. However, the configuration position of the thermistor 53 is not limited on condition that the thermistor 53 is configured near the LED chips 2. Alternatively, the thermistor 53 can be omitted.

The driver integrated circuit 54 is a semiconductor integrated circuit device for driving and protecting the LED chips 2. In this embodiment, the driver integrated circuit 54 is configured to be on the upper left in FIG. 5. More specifically, the driver integrated circuit 54 is configured, in the y-direction, on one side opposite to the connection terminals 61 with respect to the frame 3 surrounding all the LED chips 2. Further, the driver integrated circuit 54 is configured, in the x-direction, proximal to one side (the left side in FIG. 5) with respect to the center of the substrate 1. As shown in FIG. 5, when observed in the z-direction, a distance L2 from an edge 11c among edges of the main surface 11a in the y-direction and closest to the driver integrated circuit 54 to a center point P2 of the driver integrated circuit 54 is less than a half of a distance L1 from the edge 11c to a center point P1 of the main surface 11a. Furthermore, a distance from an intersection point P3 at which a straight line connecting the center point P1 and the center point P2 crosses the edge 11c to the center point P2 is less than a half of a distance from the intersection point P3 to the center point P1. Furthermore, in the y-direction, a shortest distance L3 from the LED chips 2 to the driver integrated circuit 54 is less than a dimension L4 of the driver integrated circuit 54. The dimensions of the driver integrated circuit 54 in the x-direction and the y-direction are approximately 2 to 4 mm, and are approximately 3 mm in this embodiment.

The driver integrated circuit 54 is connected to the wiring patterns 121, and 124 to 127. The driver integrated circuit 54 is connected to the connection terminal 61 through the wiring pattern 124, the diode 51 and the wiring pattern 122, and is connected to the connection terminal 63 through the wiring pattern 124, the diode 51, and the wiring pattern 123. Further, the driver integrated circuit 54 is connected to the connection terminal 62 through the wiring pattern 121. The driver integrated circuit 54 causes the current inputted from the connection terminal 61 or the connection terminal 63 to become a constant current, which is then outputted through the wiring pattern 127 to the LED chips 2. The LED lighting device A1 uses the connection terminal 61 and the connection terminal 63 to separate the input, hence it is able to emit light of two brightness levels. For example, the LED lighting device A1 can be a light shared by a tail lamp and a stop lamp having different brightness levels. Further, the driver integrated circuit 54 can also control light of the LED chips 2 by means of PWM (pulse width modulation).

The driver integrated circuit 54 and the thermistor 53 are connected through the wiring pattern 126. As shown in FIG. 5, the driver integrated circuit 54 is configured proximal to the left side, and the thermistor 53 is configured on the left of the frame 3, such that the length of the wiring pattern 126 can be reduced. The driver integrated circuit 54 suppresses an output current in order to protect the LED chips 2 in the event that the temperature detected by the thermistor 53 is more than a predetermined temperature. However, the function of the driver integrated circuit 54 is not limited in the present disclosure.

As shown in FIG. 1 to FIG. 4, the socket 7 is for forming the outer shape of the LED lighting device A1, supports the substrate 1, and is a component for installing in, for example, a vehicle. The socket 7 includes a light-emitting side cylindrical portion 71, a base plate portion 72, a connecting side cylindrical portion 73, a flange portion 74, and multiple fins 75. The socket 7 includes, for example, A1. Further, the material of the socket 7 is not limited. For example, the socket 7 can include other metals, or can further include synthetic resin.

The light-emitting side cylindrical portion 71 is a cylindrical part for accommodating the substrate 1. The light-emitting side cylindrical portion 71 has an opening toward a facing direction of the main surface 11a of the base material 11. In this embodiment, the light-emitting side cylindrical portion 71 is substantially cylindrical in shape. The base plate portion 72 covers the light-emitting side cylindrical portion 71 from a direction which the back surface 11b of the base material 11 faces. The base plate portion 72 has a through opening 72a. As shown in FIG. 4, the through opening 72a is configured as passing through the base plate portion 72 in a direction parallel to the z-direction, and is connected to an internal space of the connecting side cylindrical portion 73. The substrate 1 has the back surface 11b facing the base plate portion 72, and is accommodated inside the light-emitting side cylindrical portion 71 by inserting the pin header 65 in the through opening 72a.

The connecting side cylindrical portion 73 is a cylindrical part that protrudes from the base plate portion 72 toward one side opposite to the light-emitting side cylindrical portion 71. The connecting side cylindrical portion 73 is configured at a position overlapping the through opening 72a, when observed in the z-direction. The internal space of the connecting side cylindrical portion 73 is connected to the through opening 72a, and the other end portion of each of the connection terminals 6 is positioned therein. For example, a male connector connected to a battery of a vehicle is inserted into the internal space of the connecting side cylindrical portion 73, so as to electrically connect the battery to the multiple connection terminals 6.

The flange portion 74 protrudes from a side surface of the base plate portion 72 toward a direction orthogonal to the z-direction. In this embodiment, the flange portion 74 appears as a circle when observed in the z-direction. An outer bottom surface of the base plate portion 72 (a surface toward the same side as the back surface 11b of the base material 11) is coplanar with a bottom surface of the flange portion 74 (a surface toward the same side as the back surface 11b of the base material 11). The multiple cooling fins 75 protrude from the outer bottom surface of the base plate portion 72 and the bottom surface of the flange portion 74 toward one side opposite to the substrate 1. Each of the fins 75 has a planar plate shape, and has in the x-direction two heat dissipation surfaces 75a toward mutually opposite sides. The heat dissipation surfaces 75a are orthogonal to the x-direction, and expand in the y-direction and the z-direction. In this embodiment, nine cooling fins 75 are configured in a manner of avoiding an area in which the connecting side cylindrical portion 73 is formed.

The adhesive member 4 is placed between the substrate 1 and the base plate portion 72 of the socket 7, and bonds the substrate 1 to the base plate portion 72 of the socket 7. The bonding portion 4 is a hardened adhesive material having higher heat conductivity so it can effectively transfer heat from the substrate 1 to the socket 7. The adhesive member 4 is formed at a position that avoids the pin header 65, when observed in the z-direction.

The LED lighting device A1 is mounted and used in a manner that the substrate 1 is substantially parallel to the vertical direction. Thus, the LED lighting device A1 causes the light emitted from each of the LED chips 2 to emit toward a substantially horizontal direction (the z-direction). Further, the LED lighting device A1 is mounted in a manner that one side configured with the through holes 111 (the connection terminals 6) faces downward, that is, the connecting side cylindrical portion 73 is located on the underside. Thus, the fins 75 are located above the connecting side cylindrical portion 73, and the heat dissipation surfaces 75a are parallel to the vertical direction. Accordingly, heat dissipation can be conducted with high efficiency. The LED light device A1 is capable of, by inserting a connector connected to a battery into the internal space of the connecting side cylindrical portion 73 after installation, connecting the terminals of the connector to the connection terminals 6, thereby electrically connecting to the battery.

Next, the reasons why the driver integrated circuit 54 is configured above the frame 3 as shown in FIG. 5 (an upper side in the state of use) are described below.

Figure 7:
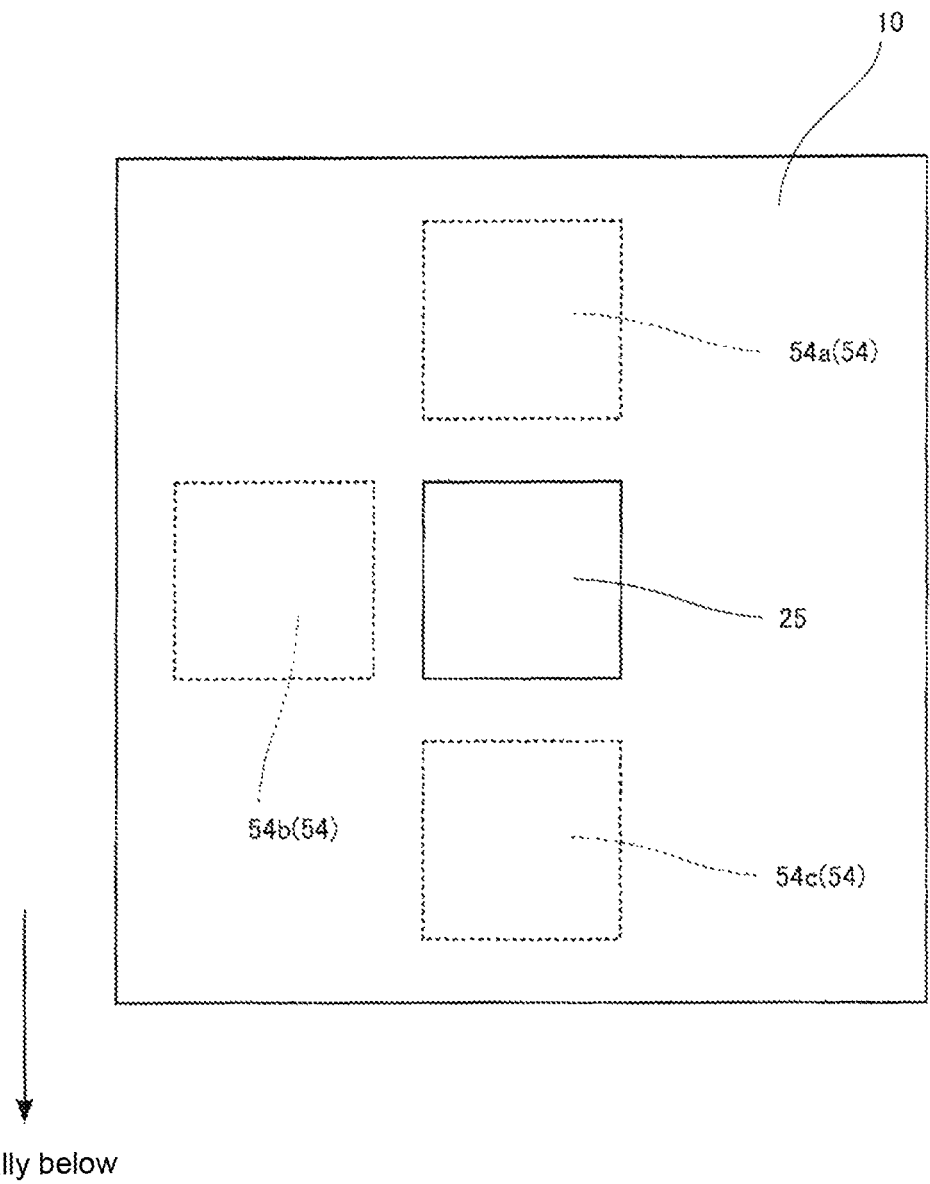
FIG. 7 is a simulation diagram illustrating verification on a relationship between configuration and influences originated from heat.

The inventor(s) carried out the simulation of the verification of a relationship between the configuration positions of the driver integrated circuit 54 and the substrate disposed with an LED module, and influences originated from heat mutually released from the driver integrated circuit 54 and the LED module. As shown in FIG. 7, a substrate 10 is configured to be parallel to the vertical direction, wherein it is square when observed from the thickness direction, and an LED package 25 (referring to a fourth embodiment below) is disposed in the center of the substrate 10. Then, in (1) a situation where the driver integrated circuit 54 is configured vertically above the LED package 25 (referring to a driver integrated circuit 54a in FIG. 7), (2) a situation where the driver integrated circuit 54 is configured horizontally left to the LED package 25 (referring to a driver integrated circuit 54b in FIG. 7), and (3) a situation where the driver integrated circuit 54 is configured vertically below the LED package 25 (referring to a driver integrated circuit 54c in FIG. 7), the temperature change in these situations is verified. Further, the dimensions of the substrate 10 are varied to verify the temperature change in each situation. In these situations, the driver integrated circuit 54 is configured at a middle position of the edge of the LED package 25 and an edge of the substrate 10. Further, respective temperatures of the driver integrated circuit 54 and the LED package 25 after applying electricity thereto for a predetermined period are measured. The dimensions of the driver integrated circuit 54 viewed from the top are 3.0 mm×2.9 mm, and the dimensions of the LED package 25 viewed from the top are 4.2 mm×3.75 mm.

Results of the simulation show that, it is determined in all of the situations (1), (2) and (3), the temperatures of the driver integrated circuit 54 and the LED package 25 rise and are more likely to be affected by heat from each other as the dimensions of the substrate 10 decrease. Further, the temperature in situation (3) is the highest, and the temperature in situation (1) is the lowest. That is, it can be determined therefrom that situation (1) in which the driver integrated circuit 54 is configured vertically above the LED package 25 is most capable of suppressing temperature rise. The reason for the above is that, in situation (1), a distance from the driver integrated circuit 54 to an upper end of the substrate 10 is reduced, and the heat of the driver integrated circuit 54 can be easily transferred along the substrate 10 and be released upward, such that it is more difficult for the LED package 25 to be affected by the heat from the driver integrated circuit 54. Therefore, in the LED lighting device A1, with respect to the frame 3 (the LED chips 2), the driver integrated circuit 54 is configured on one side opposite to the through holes 111 (the connection terminals 6) vertically below during installation.

The distance from the driver integrated circuit 54 to the upper end of the substrate 10 decreases as it is configured on the upper part of the substrate 10, thereby enhancing higher heat dissipation efficiency. Thus, in the LED lighting device A1, the driver integrated circuit 54 is configured on one side closer to the edge 11c compared to the middle of the center point P1 of the main surface 11a and the edge 11c. However, if the driver integrated circuit 54 is configured too close to the edge 11c, it is more difficult for heat to be transferred from the driver integrated circuit 54 toward the substrate 1, in a way that the heat dissipation effect is diminished. The configuration position of the driver integrated circuit 54 is appropriately set according to the position with maximized heat dissipation effect as determined by simulation verification. Furthermore, the configuration position of the driver integrated circuit 54 is also affected by the configurations of the electronic components 5 and the wiring patterns 12. However, the configuration position of the driver integrated circuit 54 is not limited to being closer to the side of the edge 11c compared to the middle of the center point P1 of the main surface 11a and the edge 11c, given that it is, in the y-direction, on one side opposite to the through holes 111 (the connection terminals 6) with respect to of the frame 3 (the LED chips 2).

Further, according to the simulation results in FIG. 7, in a situation where the dimensions of the substrate 10 are more than 20 mm×20 mm, temperature differences in situations (1), (2) and (3) are smaller. However, in a situation where the dimensions of the substrate 10 are less than 20 mm×20 mm, the temperature in situation (1) is noticeably lower than the temperatures in situations (2) and (3). That is to say, as it is determined that the dimensions of the substrate 10 are smaller, the temperature suppression effect obtained based on the configuration in (1) becomes more apparent. The temperature suppression effect is particularly apparent in a situation where the dimensions of the substrate 10 are less than 20 mm×20 mm. However, the dimensions of the substrate 10 with which the temperature suppression effect is more apparent may be varied according to the dimensions of the driver integrated circuit 54 and the LED package 25. If the dimensions of the driver integrated circuit 54 are used as a reference, it is equivalent that a more apparent effect occurs when the dimension of the substrate 1 in the y-direction in FIG. 5 is less than six times of the dimension of the driver integrated circuit 54 in the y-direction.

Next, the function of the LED lighting device A1 is described below.

According to this embodiment, the driver integrated circuit 54 is configured, in the y-direction, on one side opposite to the through holes 111 (the connection terminals 6) with respect to the frame 3 (the LED chips 2). The LED lighting device A1 is mounted and used in a manner that the substrate 1 is substantially parallel to the vertical direction. At this situation, the through holes 111 (the connection terminals 6) are configured vertically below. That is to say, in a state of use of the LED lighting device A1, the driver integrated circuit 54 is configured at a position vertically above the frame 3 (the LED chips 2). Accordingly, the temperature rise in the driver integrated circuit 54 and the LED chips 2 can be suppressed. The LED lighting device A1 serves, for example, in-vehicle uses with harsh temperature conditions. Therefore, by suppressing the temperature rise in the driver integrated circuit 54 and the LED chips 2 as much as possible, the influences originated from the temperature of the driver integrated circuit 54 and the LED chips 2 can be alleviated.

Further, according to this embodiment, as shown in FIG. 5, when observed in the z-direction, the distance L2 from the edge 11c to the center point P2 of the driver integrated circuit 54 is less than a half of the distance L1 from the edge 11c to the center point P1 of the main surface 11a. That is to say, the driver integrated circuit 54 is configured at a position closer to the side of the edge 11c compared to the middle of the center point P1 of the main surface 11a and the edge 11c. Accordingly, in the state of being used, the driver integrated circuit 54 is configured on an even upper portion of the substrate 10 and is closer to the upper end, thereby providing higher heat dissipation efficiency. Therefore, the temperature rise in the driver integrated circuit 54 and the LED chips 2 can be suppressed.

According to this embodiment, the dimensions of the substrate 1 in the x-direction and the y-direction are approximately 14 mm. Thus, compared to a situation where the driver integrated circuit 54 is configured on one the same side as the through holes 111 with respect to the frame 3, and a situation where the driver integrated circuit 54 is configured at the same position in the y-direction with respect to the frame 3, the effect of suppressing temperature rise obtained when the driver integrated circuit 54 is configured on the side opposite to the through holes 111 with respect to the frame 3 is more apparent.

According to this embodiment, the LED lighting device A1 is mounted in a manner that the through holes 111 (the connection terminals 6) are configured vertically below and the connecting side cylindrical portion 73 is located below. Hence, the fins 75 are located on an upper side of the connecting side cylindrical portion 73, and the heat dissipation surfaces 75a are parallel to the vertical direction. Thus, heat dissipation can be conducted with higher efficiency.

According to this embodiment, the thermistor 53 is configured near the LED chips 2, and is connected to the driver integrated circuit 54 through the wiring pattern 126. The driver integrated circuit 54 suppresses an output current when the temperature detected by the thermistor 53 is greater than a predetermined value. Thus, damage of the LED chips 2 caused by heat can be suppressed. Further, as shown in FIG. 5, the thermistor 53 is configured on the left side of the frame 3, and the driver integrated circuit 54 is also configured proximal to the left side. Thus, the thermistor 53 and the driver integrated circuit 54 are configured at positions close to each other on the main surface 11a, thus a length of the wiring pattern 126 for connecting the thermistor 53 and the driver integrated circuit 54 can be reduced.

Although a situation where the driver integrated circuit 54 is configured in the x-direction proximal to one side (the left in FIG. 5) compared to the center of the substrate 1 is given as an example in this embodiment; however, the present disclosure is not limited thereto. The position of the driver integrated circuit 54 in the x-direction is not limited. The driver integrated circuit 54 can be configured in the x-direction in the center of the substrate 1, or can be configured proximal to the other side (the right in FIG. 5).

Further, although a situation where the distance L2 is less than a half of the distance L1, and the driver integrated circuit 54 is configured on the side closer to the edge 11c than the middle of the center point P1 of the main surface 11a and the edge 11c is given as an example in this embodiment; however, the present disclosure is not limited thereto. The position of the driver integrated circuit 54 in the y-direction is not limited, given that the driver integrated circuit 54 is configured at a position more vertically above than the frame 3 (the LED chips 2) when the LED lighting device A1 is in a state of being used. For example, the driver integrated circuit 54 can also be configured on the side closer to the center point P1 than the middle of the center point P1 of the main surface 11a and the edge 11c.

FIG. 8 to FIG. 11 show other embodiments of the present disclosure. In these drawings, the same or similar elements as those in the embodiment above are represented by the same denotations as those in the embodiment above.

Second Embodiment

Figure 8:
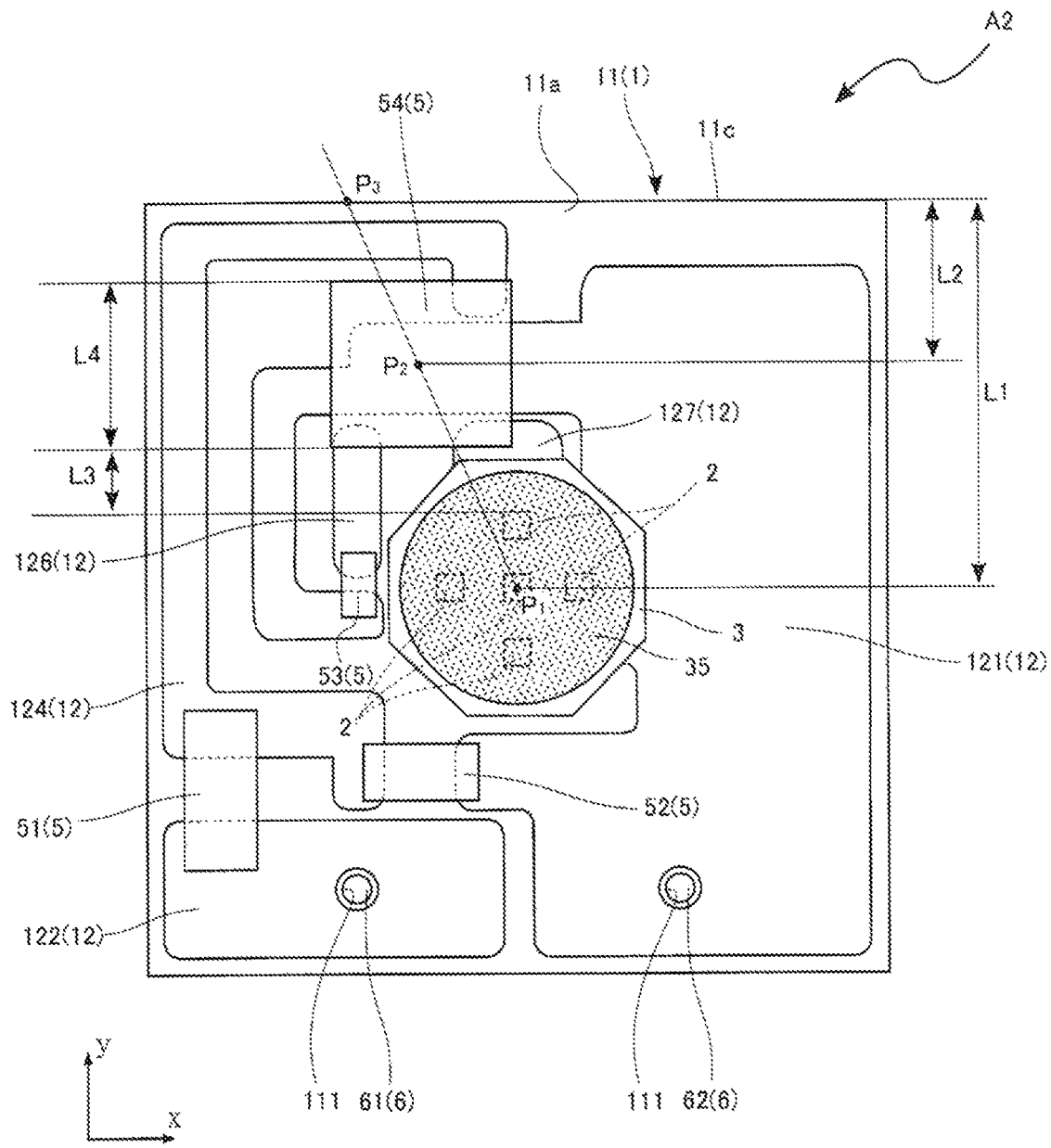
FIG. 8 is a top view of a main part of the LED lighting device according to a second embodiment of the present disclosure.

FIG. 8 shows a top view of a main part of an LED lighting device A2 according to a second embodiment of the present disclosure, and is a diagram with respect to FIG. 5. The LED lighting device A2 of this embodiment differs from the LED lighting device A1 in terms of excluding the connection terminal 63, and has a different layout on the substrate 1.

In this embodiment, a number of the through holes 111 formed on the base material 11 is two, and are arranged along the x-direction on one end closer to the y-direction (the lower end in FIG. 8). In FIG. 8, the through hole 111 on the left is inserted by the connection terminal 61, and the through hole 111 on the right is inserted by the connection terminal 62. In this embodiment, the wiring pattern 123 and the wiring pattern 125 are not provided. Further, the wiring pattern 124 does not include a right half part extending along the upper edge of the main surface 11a or the part extending along the right edge of the main surface 11a. On the other hand, the wiring pattern 121 expands to near a right edge of the main surface 11a, and surrounds the through hole 111 on the right.

Further, the diode 51 connected between the wiring pattern 122 and the wiring pattern 125 and the diode 51 connected between the wiring pattern 123 and the wiring pattern 124 in the LED lighting device A1 are not provided. Accordingly, the configuration position of the Zener diode 52 is modified. More specifically, the Zener diode 52 is configured on the lower left of the frame 3, and is connected to a part of the wiring pattern 124 extending from a lower end portion to the right and the wiring pattern 121. The configurations of the LED chips 2, the frame 3 and the driver integrated circuit 54 are not modified. However, the shapes and configurations of the wiring patterns 12 and the configurations of the electronic components 5 are only an example and are not limited. The LED lighting device A2 is used in, for example, a daylight without variable brightness levels.

In this embodiment, the configurations of the LED chips 2, the frame 3 and the driver integrated circuit 54 are also the same as those in the LED lighting device A1. That is, the driver integrated circuit 54 is configured, in the y-direction, on one side opposite to the through holes 111 (the connection terminal 6) with respect to the frame 3 (the LED chips 2). Thus, the temperature rise in the driver integrated circuit 54 and the LED chips 2 can be suppressed. Further, other effects are the same as those of the first embodiment.

Third Embodiment

Figure 9:
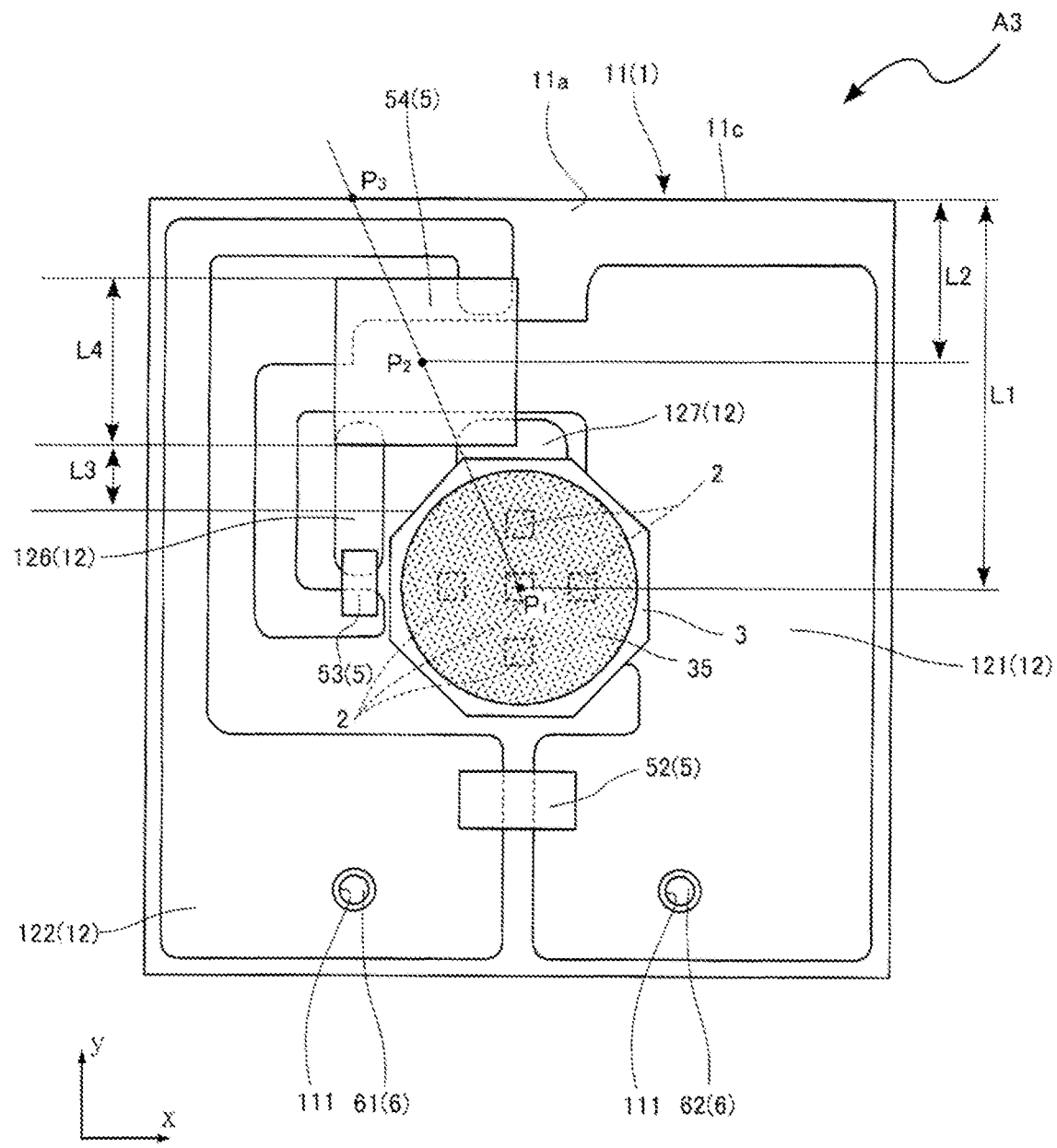
FIG. 9 is a top view of a main part of the LED lighting device according to a third embodiment of the present disclosure.

FIG. 9 shows a top view of a main part of an LED lighting device A3 according to a third embodiment of the present disclosure, and is a diagram with respect to FIG. 5. The LED lighting device A3 of this embodiment differs from the LED lighting device A2 in terms of excluding the diode 51, and in a different layout on the substrate 1.

In this embodiment, the wiring pattern 122 becomes a shape for connecting the wiring pattern 122 and the wiring pattern 124 in the LED lighting device A2. Further, the diode 51 connected between the wiring pattern 122 and the wiring pattern 124 in the LED lighting device A2 is not provided. Accordingly, the configuration position of the Zener diode 52 is modified. More specifically, the Zener diode 52 is configured below the frame 3, and is connected to the wiring pattern 122 and the wiring pattern 121. The configurations of the LED chips 2, the frame 3 and the driver integrated circuit 54 are not modified. However, the shapes and configurations of the wiring patterns 12 and the configurations of the electronic components 5 are an example, and are not limited. The LED lighting device A3 is used in a situation where a protective measure against reverse current is externally implemented.

In this embodiment, the configurations of the LED chips 2, the frame 3 and the driver integrated circuit 54 are the same as those in the LED lighting device A1. That is to say, the driver integrated circuit 54 is configured on one side opposite to the through holes 111 (the connection terminals 6) with respect to the frame 3 (the LED chips 2) in the y-direction. Thus, the temperature rise in the driver integrated circuit 54 and the LED chips 2 can be suppressed. Other effects are the same as those of the first embodiment.

Fourth Embodiment

Figure 10:
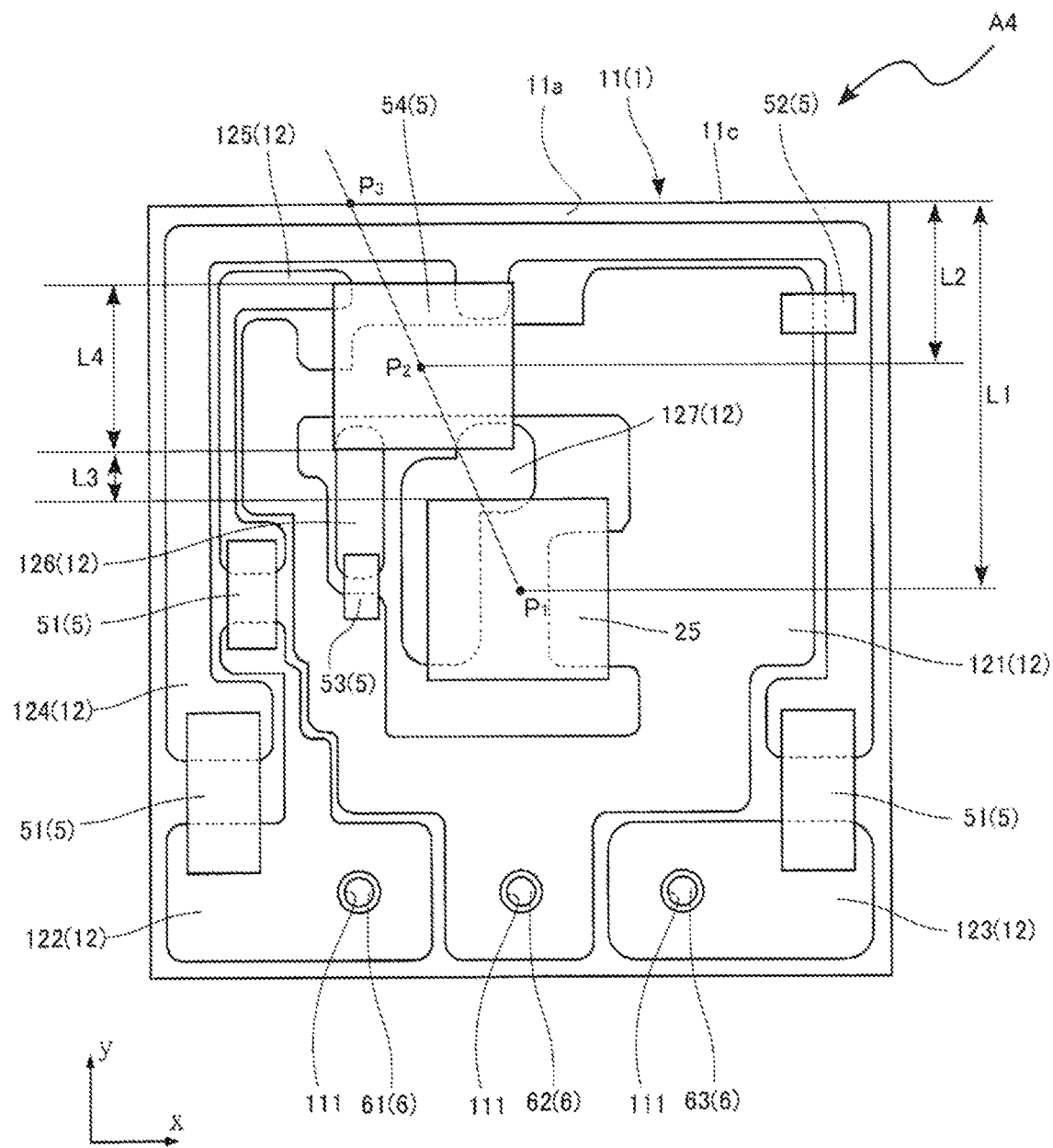
FIG. 10 is a top view of a main part of the LED lighting device according to a fourth embodiment of the present disclosure.

FIG. 10 is a top view of a main part of an LED lighting device A4 according to a fourth embodiment of the present disclosure, and is a diagram with respect to FIG. 5. The LED lighting device A4 of this embodiment differs from the LED lighting device A1 in terms of disposing the LED package 25 formed by sealing the LED chips 2 by resin on the substrate 1, instead of directly disposing the multiple LED chips 2 on the substrate 1.

In this embodiment, the LED lighting device A4 includes the LED package 25, in substitution for the multiple LED chips 2, the frame 3 and the sealing resin 35. The LED package 25 is a surface-mount package formed by sealing three LED chips 2 disposed in a package substrate by sealing resin. It should be noted that the quantity of the LED chips 2 included in the LED package 25 is not limited. Dimensions of the LED package 25 in the x-direction and the y-direction are approximately 4 mm. However, the dimensions of the LED package 25 are not limited. Two electrode pads are provided on a back surface (a surface opposite to the main surface 11a) of the LED package 25. The LED package 25 is disposed in the center of the main surface 11a of the base material 11, wherein one of the electrode pads is bonded to the wiring pattern 121, and the other electrode pad is bonded to the wiring pattern 127. In this embodiment, a shortest distance L3 in the y-direction from the LED package 25 to the driver integrated circuit 54 is less than a dimension L4 of the driver integrated circuit 54. However, the structure of the LED package 25 is not limited, and neither is the means for disposing the LED package 25. Further, the quantity of the LED package 25 disposed on the main surface 11a is not limited. In this embodiment, the LED package 25 is equivalent to the "LED module" of the present disclosure. The configuration of the driver integrated circuit 54 is not modified.

In this embodiment, the relative configuration position of the driver integrated circuit 54 with respect to the LED package 25 is the same as the relative configuration position of the driver integrated circuit 54 with respect to the frame 3 (the LED chips 2) in the LED lighting device A1. That is, the driver integrated circuit 54 is configured in the y-direction on one side opposite to the through holes 111 (the connection terminals 6) with respect to the LED package 25. Thus, the temperature rise in the driver integrated circuit 54 and the LED package 25 can be suppressed. Further, other effects are the same as those of the first embodiment.

Further, in this embodiment, a situation where one LED package 25 is disposed is given as an example; however, the present disclosure is not limited thereto. The LED lighting device A4 can also be disposed with multiple LED packages 25. In this case, the LED packages 25 are respectively configured in an LED configuration area in the center of the main surface 11a.

Fifth Embodiment

Figure 11:
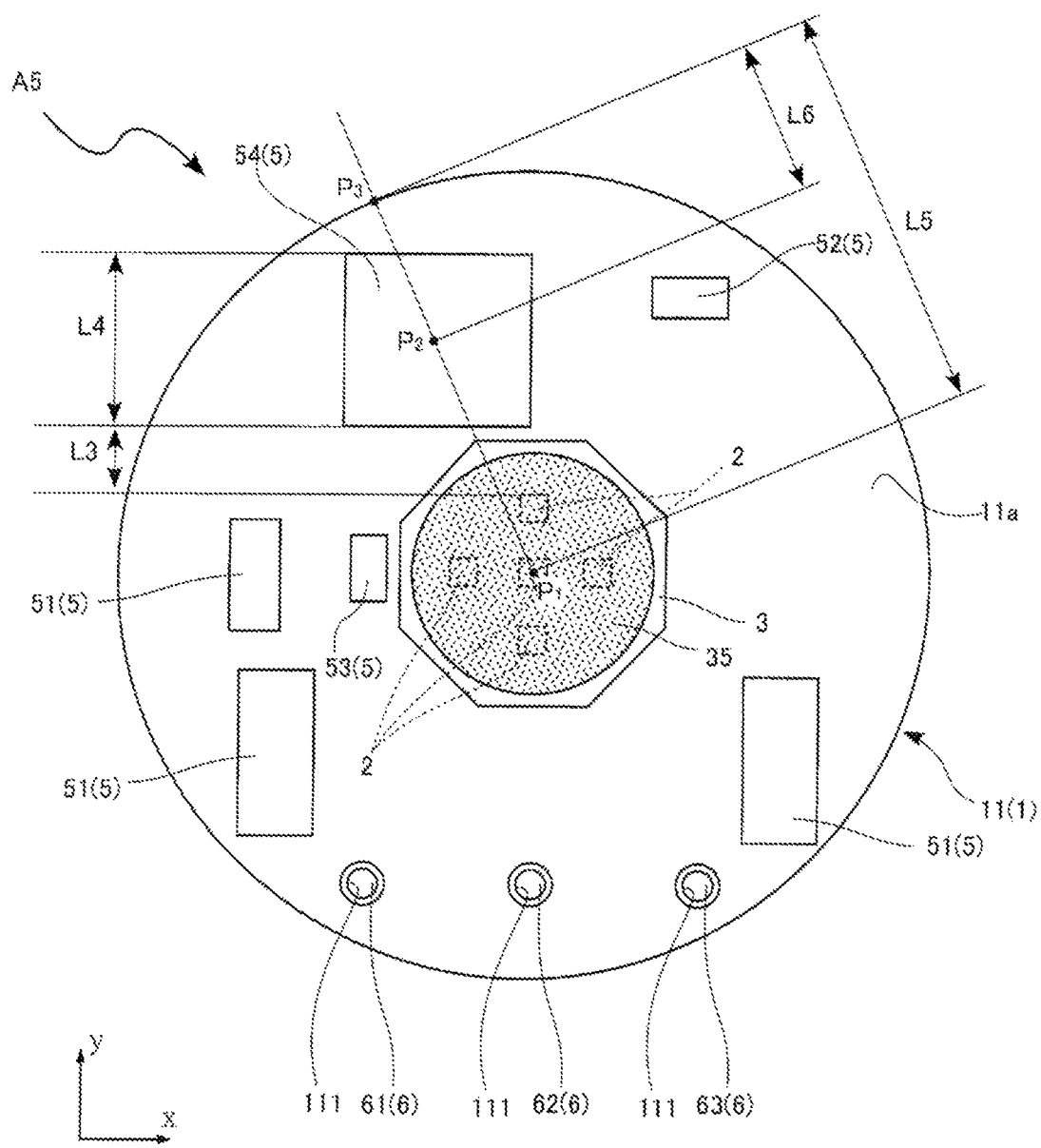
FIG. 11 is a top view of a main part of the LED lighting device according to a fifth embodiment of the present disclosure.

FIG. 11 shows a top view of a main part of an LED lighting device A5 according to a fifth embodiment of the present disclosure, and is a diagram with respect to FIG. 5. The LED lighting device A5 of this embodiment differs from the LED lighting device A1 in terms of the shape of the substrate 1 observed in the z-direction.

In this embodiment, the substrate 1 observed in the z-direction appears as a circle. The diameter of the substrate 1 is approximately 10 to 20 mm, and is approximately 14 mm in this embodiment. In this embodiment, the multiple LED chips 2 and the frame 3 observed from the z-direction are also configured in the center of the substrate 1. Further, the configuration position of the driver integrated circuit 54 is not modified, and the position relationship between the frame 3 and the driver integrated circuit 54 is the same as that in the LED lighting device A1. Further, in FIG. 11, description of the wiring patterns 12 is omitted. In this embodiment, a distance L6 from the intersection point P3 at which the straight line connecting the center point P1 of the main surface 11a and the center point P2 of the driver integrated circuit 54 crosses the edge of the substrate 1 to the center point P2 is less than one half of a distance L5 from the intersection point P3 to the center point P1.

In this embodiment, the configurations of the LED chips 2, the frame 3 and the driver integrated circuit 54 are the same as those in the LED lighting device A1. That is to say, the driver integrated circuit 54 is configured in the y-direction on one side opposite to the through holes 111 (the connection terminals 6) with respect to the frame 3 (the LED chips 2). Thus, temperature rise in the driver integrated circuit 54 and the LED chips 2 can be suppressed. Further, according to this embodiment, as shown in FIG. 11, when observed in the z-direction, the distance L6 from the intersection point P3 to the center point P2 is less than a half of the distance L5 from the intersection point P3 to the center point P1. That is, the driver integrated circuit 54 is configured on the side closer to the intersection point P3 than the middle of the center point P1 of the main surface 11a and the intersection point P3. Thus, the temperature rise in the driver integrated circuit 54 and the LED chips 2 can be suppressed. Further, other effects are the same as those of the first embodiment.

Situations where the LED lighting devices A1 to A5 of the first to fifth embodiments are used as automotive lighting devices are given as examples above; however, the application of the LED lighting devices A1 to A5 are not limited.

[Note 1]

An LED lighting device, including:

a substrate, including a base material having a main surface, and wiring patterns configured on the main surface;

an LED module, disposed on the main surface;

a plurality of connection terminals, arranged in a first direction orthogonal to a thickness direction of the substrate, respectively connected to the wiring patterns; and a driver integrated circuit disposed on the main surface and configured to drive the LED module, wherein the driver integrated circuit is disposed at a side of the LED module opposite to the connection terminals in a second direction orthogonal to the first direction and the thickness direction.

[Note 2]

The LED lighting device according to note 1, further including a socket supporting the substrate, wherein the socket includes a plurality of fins protruding from one side opposite to the substrate.

[Note 3]

The LED lighting device according to note 2, wherein each of the fins includes heat dissipation surfaces expanding in the thickness direction and the second direction.

[Note 4]

The LED lighting device according to any one of notes 1 to 3, wherein when observed in the thickness direction, a distance from an intersection point at which a straight line connecting a center of the main surface and a center of the driver integrated circuit crosses an edge of the main surface to the center of the driver integrated circuit is less than a half of a distance from the intersection point to the center of the main surface.

[Note 5]

The LED lighting device according to notes 1 to 3, wherein when observed in the thickness direction, the substrate is a rectangle, and a distance from a first edge, among edges in the second direction of the main surface, of the driver integrated circuit to a center of the driver integrated circuit is less than a half of a distance from the first edge to the center of the main surface.

[Note 6]

The LED lighting device according to any one of notes 1 to 5, wherein the LED module is one in quantity and is disposed at a center of the main surface.

[Note 7]

The LED lighting device according to any one of notes 1 to 5, wherein the main surface has an LED configuration area located in the center, and a number of the LED module is plural and the plurality of LED modules are respectively configured in the LED configuration area.

[Note 8]

The LED lighting device according to any one of notes 1 to 7, further including a thermistor disposed on the main surface.

[Note 9]

The LED lighting device according to note 8, wherein the driver integrated circuit is disposed proximal to one side in the first direction compared to the center of the substrate, and the thermistor is disposed in the first direction on the side with respect to the LED module.

[Note 10]

The LED lighting device according to any one of notes 1 to 9, further including a Zener diode disposed on the main surface.

[Note 11]

The LED lighting device according to any one of notes 1 to 10, further including a reverse current protection diode disposed on the main surface.

[Note 12]

The LED lighting device according to note 11, wherein the reverse current protection diode is configured in the second direction on a same side as the connection terminals with respect to the LED module.

[Note 13]

The LED lighting device according to any one of notes 1 to 12, wherein a dimension of the substrate in the second direction is less than six times of a dimension of the driver integrated circuit.

[Note 14]

The LED lighting device according to any one of notes 1 to 12, wherein a dimension of the substrate in the second direction is less than 20 mm.

[Note 15]

The LED lighting device according to any one of notes 1 to 12, wherein a shortest distance in the second direction from the LED module to the driver integrated circuit is less than a dimension of the driver integrated circuit.

[Note 16]

The LED lighting device according to any one of notes 1 to 15, wherein the LED module is an LED chip.

[Note 17]

The LED lighting device according to any one of notes 1 to 15, wherein the LED module is an LED package including an LED chip.

[Note 18]

The LED lighting device according to any one of notes 1 to 17, wherein the driver integrated circuit is used in orientation of being located vertically above the LED module.

What is claimed is:

1. An LED (light-emitting diode) lighting device, comprising:
   a substrate, comprising a base material having a main surface, and wiring patterns disposed on the main surface;
   an LED module, disposed on the main surface;
   a plurality of connection terminals, arranged in a first direction orthogonal to a thickness direction of the substrate, each of the connection terminals being respectively connected to the wiring patterns; and
   a driver integrated circuit disposed on the main surface and configured to drive the LED module, wherein the driver integrated circuit is disposed at a side of the LED module opposite to all the connection terminals in a second direction orthogonal to the first direction and the thickness direction,
   wherein the main surface includes a first edge and a second edge opposite to the first edge, and the first edge and the second edge are oriented along the first direction, and
   wherein the driver integrated circuit is disposed between the first edge and the LED module and all the connection terminals are disposed between the LED module and the second edge.

2. The LED lighting device according to claim 1, further comprising a socket supporting the substrate, wherein the socket comprises a plurality of cooling fins protruding from one side opposite to the substrate.

3. The LED lighting device according to claim 2, wherein each of the cooling fins comprises heat dissipation surfaces expanding in the thickness direction and the second direction.

4. The LED lighting device according to claim 1, wherein when observed in the thickness direction, a distance from an intersection point at which a straight line connecting a center of the main surface and a center of the driver integrated circuit crosses an edge of the main surface to the center of the driver integrated circuit is less than a half of a distance from the intersection point to the center of the main surface.

5. The LED lighting device according to claim 1, wherein when observed in the thickness direction, the substrate is rectangular, and a distance in the second direction from a first edge, among edges of the main surface, of the driver integrated circuit to a center of the driver integrated circuit is less than a half of a distance from the first edge to the center of the main surface.

6. The LED lighting device according to claim 1, wherein there is one LED module is one in quantity and is disposed at a center of the main surface.

7. The LED lighting device according to claim 1, wherein the main surface has an LED configuration area located in the center, and a number of the LED module is plural and the plurality of LED modules are respectively configured in the LED configuration area.

8. The LED lighting device according to claim 1, further comprising a thermistor disposed on the main surface.

9. The LED lighting device according to claim 8, wherein the driver integrated circuit is disposed proximal to one side in the first direction compared to the center of the substrate, and the thermistor is disposed in the first direction on the side with respect to the LED module.

10. The LED lighting device according to claim 1, further comprising a Zener diode disposed on the main surface.

11. The LED lighting device according to claim 1, further comprising a reverse current protection diode disposed on the main surface.

12. The LED lighting device according to claim 11, wherein the reverse current protection diode is configured in the second direction on a same side as the connection terminals with respect to the LED module.

13. The LED lighting device according to claim 1, wherein a dimension of the substrate in the second direction is less than six times of a dimension of the driver integrated circuit.

14. The LED lighting device according to claim 1, wherein a dimension of the substrate in the second direction is less than 20 mm.

15. The LED lighting device according to claim 1, wherein a shortest distance in the second direction between the LED module and the driver integrated circuit is less than a dimension of the driver integrated circuit.

16. The LED lighting device according to claim 1, wherein the LED module is an LED chip.

17. The LED lighting device according to claim 1, wherein the LED module is an LED package comprising an LED chip.

18. The LED lighting device according claim 1, wherein the driver integrated circuit is used in orientation of being located vertically above the LED module.

19. The LED lighting device according to claim 1, wherein the plurality of connection terminals are arranged linearly in the first direction orthogonal to the thickness direction of the substrate.

* * * * *